United States Patent
Herden et al.

(10) Patent No.: US 9,079,592 B2
(45) Date of Patent: Jul. 14, 2015

(54) BRAKE CONTROL DEVICE FOR A BRAKING SYSTEM OF A RAIL VEHICLE, BRAKING SYSTEM, RAIL VEHICLE AND METHOD FOR CARRYING OUT A STATE ANALYSIS OF A RAIL VEHICLE

(75) Inventors: Marc-Oliver Herden, Munich (DE); Michael Schubert, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/342,794

(22) PCT Filed: Sep. 7, 2012

(86) PCT No.: PCT/EP2012/067551
§ 371 (c)(1),
(2), (4) Date: Apr. 15, 2014

(87) PCT Pub. No.: WO2013/034719
PCT Pub. Date: Mar. 14, 2013

(65) Prior Publication Data
US 2014/0244080 A1    Aug. 28, 2014

(30) Foreign Application Priority Data
Sep. 9, 2011    (DE) .......................... 10 2011 113 084

(51) Int. Cl.
*B61L 23/00*    (2006.01)
*B60T 17/22*    (2006.01)
(Continued)

(52) U.S. Cl.
CPC .............. *B61L 23/00* (2013.01); *B60T 17/228* (2013.01); *B61K 9/12* (2013.01); *B61L 15/0081* (2013.01)

(58) Field of Classification Search
CPC ... B60T 17/228; B61L 23/00; B61L 12/0081; B61K 9/12
USPC ........................................................... 701/19
See application file for complete search history.

(56) References Cited

U.S. PATENT DOCUMENTS

2008/0033695 A1* 2/2008 Sahara et al. ................. 702/185
2010/0241296 A1* 9/2010 Rhea et al. ...................... 701/20
2010/0250081 A1* 9/2010 Kinser et al. .................... 701/70

FOREIGN PATENT DOCUMENTS

DE             10026125 A1    11/2001
DE        102006058566 A1     6/2008
(Continued)

OTHER PUBLICATIONS

Search Report for International Patent Application No. PCT/EP2012/067551; Mar. 1, 2013.
(Continued)

*Primary Examiner* — Mary Cheung
*Assistant Examiner* — Yuen Wong
(74) *Attorney, Agent, or Firm* — Barnes & Thornburg LLP

(57) ABSTRACT

A brake control device for a braking system of a rail vehicle, wherein the brake control device is connected or connectible to a vibration-sensitive sensor device for receiving vibration data. The brake control device is designed to identify at least one periodic signal from the vibration data and to store vibration data-based comparative data, and to carry out a state analysis of the rail vehicle based on the comparative data and/or the at least one periodic signal. Also disclosed is a corresponding braking system, a rail vehicle and a method for carrying out a state analysis of the rail vehicle.

9 Claims, 2 Drawing Sheets

(51) Int. Cl.
*B61K 9/12* (2006.01)
*B61L 15/00* (2006.01)

(56) References Cited

FOREIGN PATENT DOCUMENTS

| DE | 102008063891 A1 | 7/2010 |
| DE | 102010011666 A1 | 12/2010 |
| DE | 102009053801 A1 | 5/2011 |
| WO | 2006092263 A1 | 9/2006 |
| WO | 2010069521 A2 | 6/2010 |

OTHER PUBLICATIONS

Notification Concerning Transmittal of International Preliminary Report on Patentability and Written Opinion of the International Search Authority for International Patent Application No. PCT/EP2012/067551, dated Sep. 7, 2012.

English Translation of Notification Concerning Transmittal of International Preliminary Report on Patentability and Written Opinion of the International Search Authority for International Patent Application No. PCT/EP2012/067551, dated Sep. 7, 2012.

\* cited by examiner

BRAKE CONTROL DEVICE FOR A BRAKING SYSTEM OF A RAIL VEHICLE, BRAKING SYSTEM, RAIL VEHICLE AND METHOD FOR CARRYING OUT A STATE ANALYSIS OF A RAIL VEHICLE

PRIORITY CLAIM

This patent application is a U.S. National Phase of International Patent Application No. PCT/EP2012/067551, filed 7 Sep. 2012, which claims priority to German Patent Application No. 10 2011 113 084 9, filed 9 Sep. 2011, the disclosures of which are incorporated herein by reference in their entirety.

FIELD

Disclosed embodiments provide a brake control device for a braking system of a rail vehicle, a braking system for a rail vehicle with a brake control device, a rail vehicle, and a method for performing a state analysis of a rail vehicle.

BACKGROUND

Modern rail vehicles, in particular high speed trains, can be subjected to substantial loads and dangers from external circumstances. To identify problems during travel, such as for example a derailment, frequently special sensor devices are provided. Firstly, it must be ensured that a risk state is detected in good time by analyzing a state of the rail vehicle. Secondly, a reliable and punctual travel operation must not be jeopardized by false alarms.

Disclosed embodiments allow a reliable state analysis of a rail vehicle during travel and/or between journeys.

BRIEF DESCRIPTION OF THE FIGURES

Disclosed embodiments will be explained in more detail below with reference to the enclosed drawings, in which.

DETAILED DESCRIPTION OF THE DISCLOSED EMBODIMENTS

Figure 1:
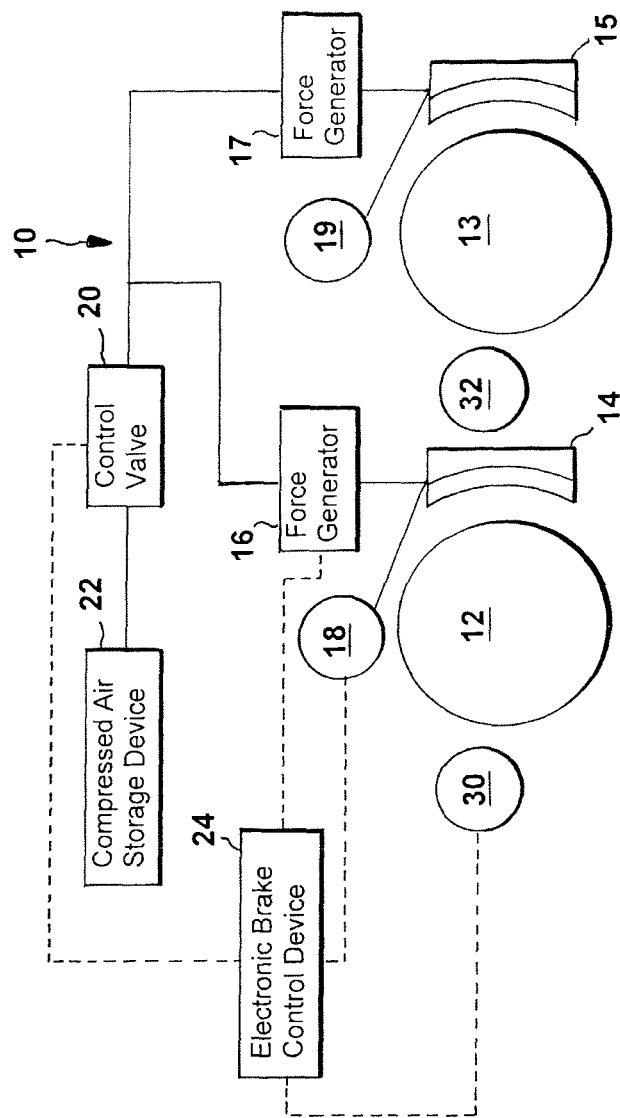
FIG. 1 shows a diagrammatic depiction of a braking system of a rail vehicle with a brake control device.

Within the context of this description, a rail vehicle designates one or more wagons with or without own drive system, and/or a traction vehicle, in any combination. In particular a rail vehicle can comprise railcars. A braking system can be a hydraulic, in particular an electrohydraulic braking system, or a pneumatic, in particular an electropneumatic braking system, or an electrical or electromechanical braking system. The braking system can comprise at least one corresponding braking device and where applicable a control device. A pneumatic or hydraulic braking device or braking system can generally be regarded as a pressure-activated braking device or braking system. Similarly, an electrical or electromechanical braking device or braking system can be designated an electrically activated brake device or braking system. A pressure-activated or electrically activated brake device can be a so-called force-contact-dependent brake device, which comprises at least one friction brake device and can transmit its brake force via a wheel-rail contact. Such a brake device can also be called a force-contact-dependent friction brake device. Typical examples of force-contact-dependent friction brake devices are disk brake devices, block brake devices or combined block/disk brake devices. Brake devices such as rail brakes which do not transmit their brake force via a wheel-rail contact, but create their own friction contact with the rails, are not regarded as force-contact-dependent brakes in this context.

An electropneumatic or electrohydraulic braking system can in particular have electrically controllable valves such as solenoid valves, or electrically controllable pre-control valves. An electric or electromechanical braking device can be activated for braking by an electrical current. A pressure-activated, in particular a hydraulic or pneumatic brake device, or an electrically activated brake device, can be provided for braking an individual wheel and/or an axle of the rail vehicle. A pressure-activated brake device such as a hydraulic or pneumatic brake device, or an electrical or electromechanical brake device, can in particular comprise at least one friction brake device with an associated force generator such as a hydraulic or pneumatic cylinder, or an electrically activatable actuator. The force generator, when pressurized with a pressure or when supplied with an electrical current, activates the associated friction brake device.

A main control valve device of the braking system can be provided which can provide a brake pressure for one or more pneumatic or hydraulic brake devices. A main control valve device can be configured to provide the brake pressure as instructed by an electronic control device, for example as instructed by a brake control device. It can be provided that the main control valve device allows the pre-control pressure to be converted into a brake pressure, for example by pressure amplification and/or by conversion of the pressure to a greater volume. A brake device can in general be provided to brake an individual wheel and/or a wheel axle of the rail vehicle.

A friction brake device can for example be a disk brake with a brake disk which is activated in that, via a brake caliper, one or more friction brake elements such as brake pad carriers with a brake lining, can be brought into contact with the brake disk to generate a braking effect in this way. A friction brake device can also comprise a brake block with a brake lining which can be activated by a force generator such as a pneumatic cylinder, such that the brake block comes into contact with a wheel tread to convert kinetic energy into heat and brake the wheel to be braked. It is conceivable that a friction brake device is provided for braking both an individual wheel or an axle.

A pressure exerted on the force generator or pneumatic or hydraulic cylinder can be called a brake pressure. An electrical current provided to activate an electrically activated brake device can be called a brake current. The force exerted by the force generator on activation of a friction brake device can be called a brake force. The brake force depends on the brake pressure exerted or the active brake current, and on the construction and function method of the friction brake device. The brake moment is the moment which is exerted on the wheel concerned for braking. The brake moment depends in particular on the brake force and the wheel geometry, in particular the wheel diameter. A brake force can be exerted on a wheel at rest or in motion. If a brake force is exerted on a moving wheel, a brake moment is generated.

By exerting a brake force on a friction brake device, a specific load of a brake force and/or brake moment is exerted on the friction brake device, in particular in a contact surface between two elements of a friction pair which move relative to each other. A friction pair can generally comprise a brake lining and friction surfaces, such as a wheel tread or a brake surface of a brake disk which, on braking, are brought into friction contact with each other. A brake control device can be an electronic control device for a braking system of a rail vehicle. The brake control device can for example be a wheel-slip protection computer, a braking computer or another control device configured to control the braking system of a rail vehicle.

Disclosed embodiments provide a brake control device for a braking system of a rail vehicle, wherein the brake control device is or can be connected to a vibration-sensitive sensor device for receiving vibration data. The brake control device is configured to identify at least one periodic signal from the vibration data and store comparison data based on the vibration data. Furthermore the brake control device is configured to carry out a state analysis of the rail vehicle based on the comparison data and/or the at least one periodic signal. Thus the data stored, which describe the state of the vehicle, can be used by the brake control device for a state analysis. In this description, quasi-periodic signals are substantially regarded as periodic signals.

A quasi-periodicity of a signal can be attributable in particular to a changing vehicle speed and/or to a changing wheel rotation speed. It can be provided that the brake control device is configured to compare, in the state analysis, vibration data obtained from the sensor device with the comparison data. In particular, current vibration data and/or the at least one periodic signal can be compared with comparison data. Comparison data can be vibration data stored in a specific format. It is conceivable that comparison data are processed and/or modified vibration data. In particular calculations based on vibration data can lead to comparison data. Comparison data can in particular be based on the travel speed and/or one or more wheel rotation speeds which can be assigned to the vibration data. In particular it can be provided that the vibration data are filtered based on assigned wheel rotation speed data and/or travel speed data, to obtain a signal independent of a wheel rotation speed and/or independent of the travel speed, and on which the comparison data can be based. In particular data can be standardized to a common time basis and/or wheel rotation speed basis.

Vibration data and sensors of a sensor device can in particular be assigned to a brake device, for example a brake caliper, a suspension of a brake device, a brake block or a suspension of one or more brake devices on a bogie of a vehicle. Vibration data can represent or include the vibrations at one or more such locations. In particular, vibration data can be assigned to mechanical vibrations of components of the vehicle, a bogie, a wheel suspension, a wheel and/or a brake device. Comparison data can be assigned to individual sensors and/or locations in the vehicle.

Periodic signals can for example represent defect points on one or more wheels which may be perceptible by vibration. Such a defect point can for example be an unevenness on a wheel tread or on a brake surface of a disk brake. The state analysis can be carried out in particular during unbraked travel, such as normal travel, while the vehicle is not being braked or while at least one brake device assigned to the sensor device is not activated. A state analysis can also be carried out while the vehicle is at rest, for example as part of a maintenance operation. Then stored data can be accessed. It can be provided that a more extensive analysis is carried out while the vehicle is at rest and a greater data quantity is analyzed than during travel. If the typical periodic vibration states of a vehicle are known, by comparison with the periodic signals represented by one or more periodic signals or their spectrum, firstly newly emerging periodic signals can be identified and secondly current, non-periodic events of particular relevance can be detected.

For this, in particular, amplitudes of signals can be compared with the comparison data. To identify periodic signals, vibration signals with a time basis can for example be transformed into a frequency basis to obtain a frequency spectrum. Frequency spectra can be determined at different times, for example at predefined intervals, and stored as comparison data. In particular a temporal development of a frequency spectrum can be recorded. A Fourier transformation can be used, in particular a fast Fourier transformation (FFT). The comparison data can in particular be periodic signals which were identified from the vibration data. It is conceivable that defect points are identified and displayed, based on periodic signals. This can be relevant in particular for maintenance.

It is also conceivable that, based on the comparison data, a development of periodic signals over longer periods is monitored. The brake control device can for example be configured to monitor whether the amplitudes of periodic signals, which may indicate defect points, increase over a longer period. It can be provided that when an amplitude of a periodic signal has exceeded a threshold value, a warning signal is output which indicates an increased maintenance need and/or the necessity for immediate action. Secondly, it may be suitable to use defect points which generate periodic signals with a low, non-safety relevant amplitude, to classify temporal developments and identify unusual signals which may occur non-periodically.

For this in particular correlation analyses can be carried out. The brake control device can generally be configured to control one or more braking devices. In particular the brake control device can be configured to control or regulate a pressure-activated or electrically activated braking system with one or more corresponding pressure-activated or electrically activated brake devices and corresponding friction brake devices. The brake control device can be configured to perform the described vibration monitoring in parallel to an additional monitoring of the rail vehicle or of the braking system of the rail vehicle. In particular, the brake control device offers the possibility of providing an additional redundancy level for observation and monitoring of the braking system and/or vehicle.

By suitable transformation, the comparison data can represent a comparison basis for signals which may be expected during travel. New signals occurring can be compared with this comparison basis. Deviations from such a comparison basis, which for example exceed a predefined threshold value, can in some cases serve as indicators for a specific event or a specific state of the vehicle, and/or as triggers for a possible control measure of the vehicle. It can be provided that the rail vehicle is braked by the brake control device in response to a warning signal and/or exceeding of a predefined threshold value.

It can be suitable for the brake control device to be configured to compare, in the state analysis, data based on vibration data received from the sensor device with stored comparison data. For this the vibration data and/or comparison data are transformed in particular into the same format. It can furthermore be provided that any required filtering is carried out, in particular in relation to speed and/or wheel rotation speed, to produce datasets with the same or comparable standardization.

The sensor device can comprise at least one vibration-sensitive sensor to detect a brake moment and/or a brake force exerted by a friction brake device. The friction brake device can be a friction brake device of a pressure-activated or electrically activated braking system, in particular a force-contact-dependent brake device. Such a vibration-sensitive sensor can in particular be assigned to a pressure-activated or electrically activated brake device, a friction brake device and/or a bogie on which at least one friction brake device is suspended. Sensors can also be provided for more than one brake device, or for more than one friction brake device. In particular it is suitable if a sensor is assigned to a friction brake device so that it can detect the brake force, or an associated brake moment, generated by this friction brake device. If such a friction brake device is not activated, the sensor can pick up oscillations and vibrations generated during travel and transmit these to the brake control device.

A state analysis or identification of periodic signals and/or the storage of comparison data can take place in particular during a state in which an associated friction brake device is not activated, since then the oscillations and vibrations are not overlaid by signals connected to braking, which usually have substantially greater amplitudes than mechanical vibrations during travel. The brake control device can be configured to carry out a state analysis during a braking, based on vibration data from sensors assigned to brake devices or friction brake devices which are not activated during the braking. For example during travel, a braking can be carried out using a reduced number of friction brake devices or entirely without a friction brake device, for example if an eddy-current brake is used. It is also conceivable that a magnetic rail brake or another type of brake is used, without the need to use a pressure-activated or electrically activated braking system. Then the vibration sensors of the brake devices not activated pick up any periodic signals which are generated by the activated brake devices and could indicate possible problems or defect points of these activated braking systems.

It is also conceivable that the brake control device is configured such that during braking, it commands at least one specific friction brake device of a braking system not to brake, and is configured to receive and process vibration data from at least one sensor assigned to this at least one friction brake device for state analysis. For example, such a command may be issued specifically by the brake control device to obtain suitable vibration data during a braking. It can be provided that the brake control device is configured to leave at least one friction brake device deactivated during braking. Hence this friction brake device does not contribute to a braking. During the braking, sensor vibration data from a sensor assigned to this at least one deactivated friction brake device can be transmitted to the brake control device, from which the brake control device identifies periodic signals and which can serve as a basis for comparison data. In this way for example defect points on other braking devices can be determined without additional sensors being required for this. In particular, the temporal development of defect points can thus be monitored during brakings with low brake effect. The brake control device can in particular be configured to store, as comparison data, brake parameters with which a braking is triggered. For example a brake pressure or brake current provided for one or more friction brake devices, and/or data concerning a temporal development of the brake pressure or brake current, can be regarded as brake parameters. Such data can be stored with other comparison data based on vibration data. It can be provided that the brake control device is configured to use data relevant for braking, such as for example a deceleration and/or a brake force exerted and/or a wheel rotation speed change, for filtering comparison data, or to store these as part of the comparison data.

The sensor device can be assigned to at least one friction brake device. This therefore gives a fixed allocation of vibration data to a friction brake device, which allows detailed analysis of vibration data or the state of the rail vehicle.

In at least one disclosed embodiment, it can be provided that the brake control device is or can be connected to at least one wheel rotation speed sensor. Such a wheel rotation speed sensor can in particular be assigned to a wheel which can be braked by a friction brake device assigned to a sensor of the sensor device. This gives a direct association between a measured wheel rotation speed of a particular wheel and its assigned vibration data. It can be provided that a wheel rotation speed sensor transmits or can transmit wheel rotation speed data to the brake control device. On the basis of the wheel rotation speed data from more than one wheel rotation speed sensor, for example a travel speed can be determined. It is also conceivable that, for receiving travel speed data, the brake control device is or can be connected to a further control device, a suitable sensor device and/or a GPS receiver.

It may be suitable for the brake control device to be configured to carry out a state analysis based on line data which concern a route traveled by the rail vehicle. Thus external circumstances which can affect the vibration data may be taken into account, whereby the quality of the state analysis is improved. Line data can for example be based on GPS data or other satellite positioning data, map data and/or topographical data. In particular it can be provided that the line data concern altitude differences and/or uphill or downhill gradients which are taken into account in the state analysis. Alternatively or additionally, it can be provided that comparison data based on line data are stored, and that vibration data are filtered based on line data. It can also be provided that the comparison data comprise corresponding line data, in particular position data, so that as well as a temporal development of vibration data or comparison data, a spatial dependency of the development of vibration data or comparison data can be stored and reconstructed.

A line can be divided into different line portions, and certain comparison data assigned to each of these portions. For example an average frequency spectrum and/or another type of comparison basis, which, for example, was stored as comparison data during a typical journey over a line portion, can be assigned to that line portion. Then deviating amplitudes or non-periodic signals can be identified particularly reliably in a comparison with such a comparison basis for the associated line portion. A line portion can for example be a portion in which an uphill or downhill gradient is substantially constant. It can also be provided that a line portion is defined such that the travel speed to be expected thereon is substantially constant. A line portion can have a starting point and an end point. A starting point or end point can be defined for example by a point at which the uphill or downhill gradient changes. A starting point or end point can also be determined by the start of a particularly straight or particularly twisty line, or by the start or end of a braking section, for example before a station or level crossing. Line data can be predefined and/or defined during travel based on known line data by the brake control device or a higher control device.

In another disclosed embodiment, it may be provided that the brake control device is configured to establish, in the state analysis, a derailment of at least one wheel based on a non-periodic signal from the sensor device. Such a signal can be reflected in vibration data and/or in comparison data. In this case the state analysis can be carried out in particular during travel, i.e. it can be a travel state analysis. In particular, it can be provided that a non-periodic signal is compared with comparison data, in particular with amplitudes of comparison data.

For example, the non-periodic signal can be compared with amplitudes of the periodic signal contained in the comparison data. A derailment can be concluded in particular if a strong deviation from former periodic signals, in relation to amplitude and/or spectrum, occurs for one wheel or more than one wheel. It can be provided that the brake control device compares such a non-periodic signal with predefined, theoretically or experimentally determined, stored derailment data to conclude that a derailment has occurred. It may be suitable if the brake control device is configured to carry out a derailment analysis via at least one additional derailment sensor device, which is or can be operated in redundancy to the vibration-sensitive sensor device. For example, a plausibility check of the signals from the derailment sensor device and/or the vibration sensor device can be used to determine whether a derailment has actually occurred. In this way an improved derailment detection is possible. In particular a direct allocation of sensors of the vibration-sensitive sensor device to individual wheels or individual friction devices allows an improved identification of the location of a derailment and/or a temporal development of a derailment. Thus for example using the comparison data, where applicable it is possible to detect when and which wheels or which axles assigned to the wheels are derailed.

Disclosed embodiments also provide a braking system for a rail vehicle with a brake control device as described above. The braking system can have generally any type of suitable brake device, such as for example a magnetic rail brake or an eddy-current brake. In particular the braking system can comprise one or more pressure-activated or electrically activated brake devices which in particular can be force-contact-dependent brake devices, and/or other brake devices. It can be provided that the braking system comprises the vibration sensor device. The brake control device can be configured and/or connected to control one or more of the brake devices of the braking system.

Furthermore, a rail vehicle is provided with a braking system described above and/or with a brake control device described above.

Disclosed embodiments further provide a method for performing a state analysis of a rail vehicle with the steps of reception, by a brake control device described above, of vibration data which are transmitted by a vibration-sensitive sensor device, and identification by the brake control device of at least one periodic signal in the vibration data, and storage by the brake control device of comparison data based on the vibration data. The method furthermore comprises the step of performance by the brake control device of a state analysis of the vehicle based on the comparison data and/or the at least one periodic signal. It can be provided that the brake control device compares, in the state analysis, data based on vibration data received from the sensor device with stored comparison data. The sensor device can comprise at least one vibration-sensitive sensor which can detect a brake moment and/or a brake force exerted by a friction brake device. The sensor device can be assigned to at least one friction brake device. It can be provided that the brake control device carries out the state analysis based on line data which concern routes traveled by the rail vehicle. During this state analysis, the brake control device can establish a derailment of at least one wheel based on a non-periodic signal from the sensor device.

FIG. 1 shows diagrammatically a braking system 10 of a rail vehicle, which in this example is a pneumatic braking system. Mechanical and pneumatic connections and lines are shown in solid lines, while electrical or communication channels are shown in dotted lines. The braking system 10 is provided to brake the wheels 12 and 13 of the rail vehicle. In this example, it is provided that the wheels 12 and 13 are situated on different wheel axles. A first brake block 14 is assigned to the first wheel 12.

A second brake block 15 is assigned to the second wheel 13. Each of the brake blocks 14, 15 has a brake lining which, when the brake block with the brake lining is pressed against the tread of the associated wheel 12, 13, brakes the associated wheel. The brake lining is subject to wear which is reflected amongst others in the abrasion of the brake lining. The brake block 14 can be activated for braking by a force generator 16. The force generator 16 is connected via a supply line to a main control valve device 20. Compressed air can be supplied to the force generator 16 via the main control valve device 20. Similarly a force generator 17 is assigned to the brake block 15 and is also supplied with compressed air via the main control valve 20, to activate the force generator to bring the brake block 15 into contact with the tread of the wheel 13.

The main control valve device 20 is connected to a compressed air storage device 22, from which it can draw compressed air to provide this to the force generators 16, 17 on braking. Furthermore, an electronic brake control device 24 formed as a brake computer is provided, which can control the main control valve device 20. For this the main control valve device 20 in particular can have one or more solenoid valves, which can be controlled by the brake control device 24. For reasons of clarity, the electrical control lines for the components assigned to the second wheel are not shown. They are however comparable with the control lines assigned to the first wheel. Furthermore a load sensor 18 is assigned to the first wheel 12 which can determine a load exerted on the brake block 14 during braking, for example a brake force and/or brake moment. Such a load sensor can for example comprise one or more strain gauges. The sensor 18 is connected to the electronic brake control device 24 for data transmission.

Furthermore a first wheel rotation speed sensor 30 is assigned to the wheel 12 which can detect the rotation speed of the wheel 12. This sensor too is connected to the electronic control device 24 for data transmission. Similarly, a second load sensor 19 is assigned to the second wheel and can determine the load exerted on the brake block 15, such as a brake force and/or brake moment. The sensors 18, 19 form part of a vibration-sensitive sensor device. In addition, a second wheel rotation speed sensor 32 is assigned to the second wheel 13. The force generators 16, 17 can each comprise pneumatic cylinders which, when pressurized with a brake pressure, exert a brake force on the associated brake block 14, 15. The force generators 16, 17 can each comprise a valve device, which can be controlled by the electronic control device 24 and via which a main brake pressure provided by the main control valve device 20 can be adjusted individually for the respective pneumatic cylinders of the force generators 16, 17. Thus in particular, the force generators 16, 17 can apply different brake pressures at the brake blocks 14, 15 as instructed by the electronic control device 24, and hence activate the friction brake devices asymmetrically.

In FIG. 1, the force generator 16 with the brake block 14 can be regarded as the first friction brake device. The force generator 17 and the second brake block 15 can be regarded as the second friction brake device. Evidently both friction brake devices can comprise associated brake linkages, suspensions and lines which are not shown, and can be regarded as parts of pneumatic brake devices. Instead of being formed as block brakes, the friction brake devices can also be formed as disk brakes. In this case too, a load sensor and a brake force sensor can be provided which detect a brake force exerted on braking and transmit this to the electronic brake control device 24. The brake control device 24 is configured to receive data from sensors 18 and 19 and, based on this data, determine a load on the associated friction brake device of the first wheel 12 or second wheel 13 and use this to control and/or monitor a braking process. If the friction braking devices are not activated, the sensors 18 and 19 pick up mechanical vibrations which develop and propagate in the region of the associated friction brake device. The brake control device 24 is configured to receive vibration data which correspond to these mechanical vibrations from sensors 18, 19.

In particular, the friction brake devices monitored act as unsprung masses, the vibrations of which can be picked up by sensors 18, 19. In unbraked state, these vibration data reflect for example defect points on the wheel tread or other periodic events. The brake control device 24 is configured to identify periodic signals in the vibration data and assign these to the corresponding sensor 18, 19 or associated friction brake device. Furthermore, the brake control device 24 calculates comparison data, which it stores, based on vibration data. Thus data, in particular spectra of vibration data, can be stored as comparison data at regular intervals to be able to monitor a temporal development of the vibration spectrum, in particular the periodic signals contained therein. Suitably the signals are standardized taking into account the data from the wheel rotation speed sensors, so that they are independent of the wheel rotation speed. Alternatively or additionally, comparison data and/or vibration data can be standardized in relation to travel speed. Then for example, a comparison basis can be determined from the comparison data, line portion by line portion.

For example, for certain line portions a comparison data average can be determined, as an average spectrum. The line portions can for example be defined for a particular line so that a line portion substantially has a constant uphill or downhill gradient. A new line portion can be defined on a change in uphill or downhill gradient. Line portions can also extend up to or from proposed stopping points. A line portion can also be defined by a valid predefined maximum speed or minimum speed which applies constantly thereon. This gives basic data for certain line portions, which allows a portion by portion comparison with current vibration data, to be able to analyze and assess the current driving state better.

Figure 2:
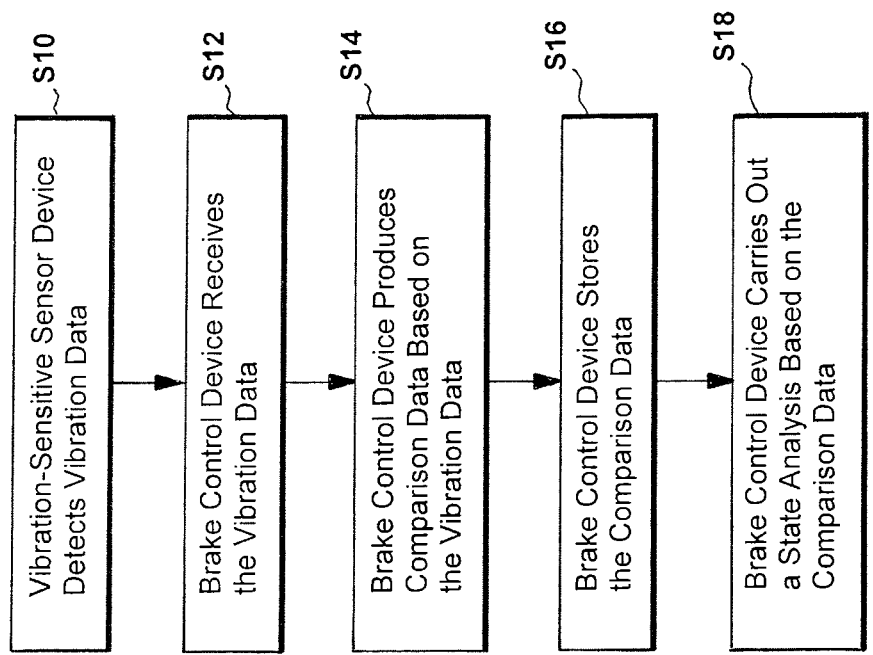
FIG. 2 diagrammatically shows a flow diagram of a method for performance of a state analysis of a rail vehicle.

FIG. 2 shows a flow diagram of a method for performing a state analysis of a rail vehicle. The rail vehicle can in particular comprise a braking system according to FIG. 1. In a step S10, a vibration-sensitive sensor device detects vibration data. In particular, the sensor device can detect vibration data of a friction brake device or a suspension of a friction brake device. The vibration data can in particular be detected during a travel of the rail vehicle, when the associated friction brake device is not activated. The sensor device transmits the vibration data to a brake control device. In a step S12, the brake control device receives the vibration data. In a following step S14, the brake control device identifies periodic signals in the vibration data. For this in step S14 for example, suitable transformations can be carried out, such as a Fourier transformation of vibration data. It is also conceivable that the sensor device is configured to provide previously transformed vibration data in the frequency domain. Furthermore the brake control device in step S14 produces comparison data based on the vibration data. The comparison data can for example comprise identified periodic signals.

It is conceivable that comparison data are generated from processed vibration data, for example transformed vibration data. The comparison data can for example comprise data on the temporal and/or spatial allocation of vibration data, and/or indicate to which friction brake devices and/or to which position in the vehicle the vibration data are assigned. To produce the comparison data, the brake control device can carry out suitable mathematical calculations. In a step S16 which follows step S14, the brake control device stores the comparison data. The data can for example be stored in a volatile or non-volatile memory of the brake control device or in an external memory. After step S16, a step S18 is carried out in which the brake control device carries out a state analysis of the vehicle based on the comparison data. The state analysis can be carried out during travel. Such a travel state analysis can be carried out continuously or at regular intervals, in particular during an unbraked travel. It is also conceivable that the state analysis is carried out subsequently or during a stop of the vehicle.

The features of the invention disclosed in the description hereinabove, in the drawings and in the claims, can be essential for the implementation of the invention both individually and in any arbitrary combination.

LIST OF REFERENCE NUMERALS

10 Braking system
12 First wheel
13 Second wheel
14 First brake block
15 Second brake block
16 First force generator
17 Second force generator
18 First brake force sensor
19 Second brake force sensor
20 Main control valve device
22 Main compressed air storage device
24 Brake control device
30 First wheel rotation speed sensor
32 Second wheel rotation speed sensor

The invention claimed is:

1. A brake control device for a braking system of a rail vehicle,
   wherein the brake control device is connected to a sensor device for receiving vibration data,
   wherein the brake control device identifies at least one periodic signal from the vibration data and stores comparison data based on the vibration data,
   wherein the brake control device carries out a state analysis of the rail vehicle based on the comparison data and/or at least one periodic signal, wherein the brake control device carries out the state analysis while the rail vehicle is not being braked or while at least one brake device assigned to the sensor device is not activated, and
   wherein the sensor device comprises at least one vibration-sensitive sensor for detecting a brake moment and/or a brake force exerted by a friction brake device.

2. The brake control device of claim 1, wherein the brake control device compares, in the state analysis, data based on vibration data received from the sensor device with stored comparison data.

3. The brake control device of claim 1, wherein the sensor device is assigned to at least one friction brake device.

4. The brake control device of claim 1, wherein the brake control device is connected to at least one wheel rotation speed sensor.

5. The brake control device of claim 1, wherein the brake control device carries out the state analysis based on line data which concern a route traveled by the rail vehicle.

6. The brake control device of claim 1, wherein the brake control device establishes, in the state analysis, a derailment of at least one wheel based on a non-periodic signal from the sensor device.

7. A braking system for a rail vehicle with a brake control device, wherein the brake control device is connected to a sensor device for receiving vibration data, wherein the brake control device identifies at least one periodic signal from the vibration data and stores comparison data based on the vibration data, wherein the brake control device carries out a state analysis of the rail vehicle based on the comparison data and/or at least one periodic signal, wherein the brake control device carries out the state analysis while the rail vehicle is not being braked or while at least one brake device assigned to the sensor device is not activated, and wherein the sensor device comprises at least one vibration-sensitive sensor for detecting a brake moment and/or a brake force exerted by a friction brake device.

8. A rail vehicle with a braking system comprising a brake control device, wherein the brake control device is connected to a sensor device for receiving vibration data, wherein the brake control device identifies at least one periodic signal from the vibration data and stores comparison data based on the vibration data, wherein the brake control device carries out a state analysis of the rail vehicle based on the comparison data and/or at least one periodic signal, wherein the brake control device carries out the state analysis while the rail vehicle is not being braked or while at least one brake device assigned to the sensor device is not activated, and wherein the sensor device comprises at least one vibration-sensitive sensor for detecting a brake moment and/or a brake force exerted by a friction brake device.

9. A method for performing a state analysis of a rail vehicle, the method comprising:

receiving, by a brake control device, vibration data which are transmitted by a vibration-sensitive sensor device;

identifying at least one periodic signal in the vibration data by the brake control device;

storing comparison data based on the vibration data by the brake control device; and performing a state analysis of the rail vehicle by the brake control device based on the comparison data and/or the at least one periodic signal, wherein the state analysis is performed while the rail vehicle is not being braked or while at least one brake device assigned to the sensor device is not activated, and wherein the sensor device comprises at least one vibration-sensitive sensor for detecting a brake moment and/or a brake force exerted by a friction brake device.

* * * * *